(12) United States Patent
Sheynman et al.

(10) Patent No.: US 7,304,572 B2
(45) Date of Patent: Dec. 4, 2007

(54) CELLULAR COMMUNICATIONS BASED INTERCOM SYSTEM AND METHODS

(75) Inventors: Arnold Sheynman, Northbrook, IL (US); Michael L. Charlier, Palatine, IL (US); Mikhail T. Galeev, Aurora, IL (US); Dongmin Liu, Grayslake, IL (US); Yingchun Ran, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 158 days.

(21) Appl. No.: 10/880,295

(22) Filed: Jun. 29, 2004

(65) Prior Publication Data

US 2005/0285734 A1  Dec. 29, 2005

(51) Int. Cl.
*G08B 1/08* (2006.01)

(52) U.S. Cl. .......................... 340/539.14; 340/539.11; 340/539.25

(58) Field of Classification Search .............. 340/539.1, 340/539.11, 539.14, 539.16, 539.17, 539.18, 340/539.23, 539.25, 572.1, 10.2, 531, 3.1, 340/3.21, 5.64, 5.7; 700/83, 90; 379/37, 379/42, 100.16; 455/456.1, 457, 422.1; 380/277; 348/14.06
See application file for complete search history.

(56) References Cited

U.S. PATENT DOCUMENTS

| | | | |
|---|---|---|---|
| 4,939,772 A * | 7/1990 | Goto ...................... 379/100.16 |
| 5,086,385 A * | 2/1992 | Launey et al. ................. 700/83 |
| 5,428,388 A | 6/1995 | Von Bauer et al. |
| 5,774,039 A | 6/1998 | Housley |
| 5,802,467 A | 9/1998 | Salazar et al. |
| 5,917,405 A | 6/1999 | Joao |
| 6,438,221 B1 | 8/2002 | Lee et al. |
| 6,580,906 B2 * | 6/2003 | Bilgic et al. .............. 455/422.1 |
| 6,658,091 B1 * | 12/2003 | Naidoo et al. ................ 379/37 |
| 6,681,118 B2 * | 1/2004 | Raffel et al. .............. 455/552.1 |
| 6,792,323 B2 * | 9/2004 | Krzyzanowski et al. ...... 700/90 |
| 6,801,524 B2 * | 10/2004 | Eteminan .................... 370/352 |
| 6,850,266 B1 * | 2/2005 | Trinca ..................... 348/14.09 |
| 6,894,609 B2 * | 5/2005 | Menard et al. ............. 340/531 |
| 6,967,562 B2 * | 11/2005 | Menard et al. ............ 340/5.64 |
| 6,996,402 B2 * | 2/2006 | Logan et al. ............. 455/456.1 |
| 7,170,998 B2 * | 1/2007 | McLintock et al. ......... 380/277 |
| 2003/0013503 A1 | 1/2003 | Menard et al. |

FOREIGN PATENT DOCUMENTS

GB    2 366 141 A    2/2002
WO    WO 01/93220 A1    12/2001

OTHER PUBLICATIONS

Kono Noriaki; "Patent Abstracts of Japan"; vol. 2003, No. 11; Nov. 5, 2003; 1 page.
Kagaya Atsushi; "Patent Abstracts of Japan"; vol. 2003, No. 12; Dec. 5, 2003; 1 page.

* cited by examiner

*Primary Examiner*—Van T. Trieu
(74) *Attorney, Agent, or Firm*—Roland K. Bowler, II

(57) ABSTRACT

A method in an intercom system including detecting the presence of a visitor at a visitor monitor, communicating (224) information received at the visitor monitor in association with the visitor detected to a remotely located communications network gateway, communicating (232) the presence of the visitor from the communication network gateway to a remote terminal, and forwarding the information received from the communications network gateway to the remote terminal.

21 Claims, 13 Drawing Sheets

*900*

MAPPING_ID TABLE:

| HCG_ID (910) | REMOTE_PHONE_ID (920) |
|---|---|
| 15618881688 | 15615454451 |
| 18471234567 | 18477654321 |

• • •

IMAGES TABLE:

| HCG_ID (930) | TIMESTAMP (932) | IMAGE_PATH (934) | STATUS (936) |
|---|---|---|---|
| 15618881688 | 02_18_2004_14:37:28 | /IMAGES/15618881688_02_18_2004_14:37:28.JPEG | NEW |
| 18471234567 | 02_18_2004_12:27:58 | /IMAGES/15618881688_02_18_2004_14:37:28.JPEG | OLD |
| 18471234567 | 02_18_2004_12:27:58 | /IMAGES/15618881688_02_18_2004_14:37:28.JPEG | NEW |

*950*

CELLULAR COMMUNICATIONS BASED INTERCOM SYSTEM AND METHODS

FIELD OF THE DISCLOSURE

The present disclosure relates generally to wireless communications, and more particularly to wireless communications, for example, cellular communications, based intercom and remote command and control systems methods.

BACKGROUND OF THE DISCLOSURE

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
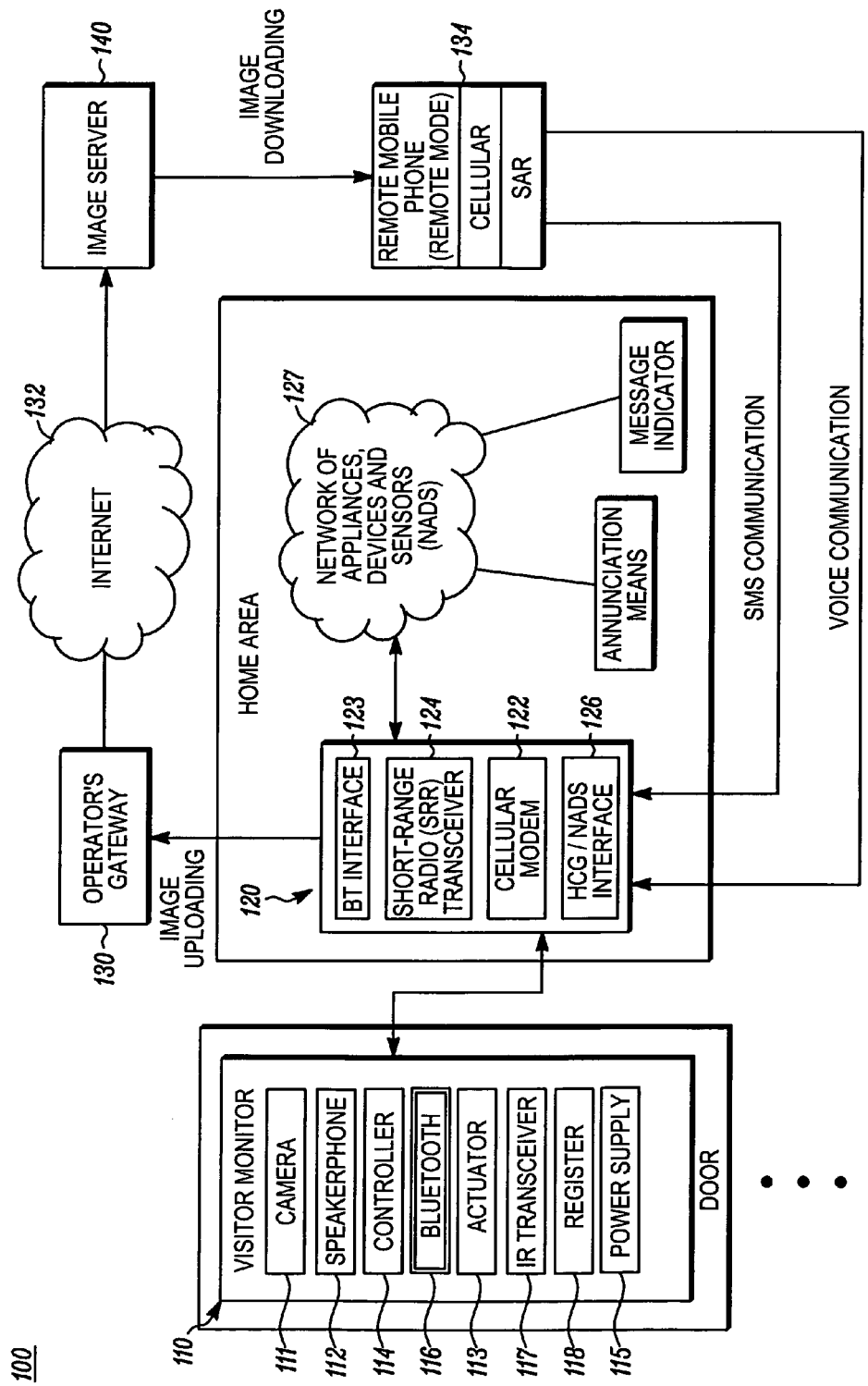
FIG. 1 is an exemplary intercom system.

In FIG. 1, the exemplary intercom system 100 comprises generally one or more visitor monitors 110 at corresponding locations, for example, at entry doors or gates. The visitor monitor includes a visitor communications interface. In the exemplary embodiment of FIG. 1, the visitor communications interface includes a camera 111 for obtaining still or video images of visitors and objects to be monitored. The exemplary visitor communications interface also includes a speakerphone 112 for communicating voice to and from visitors. In other embodiments, the visitor communications interface of the visitor monitor includes only one or the other of the voice and video communications devices. In alternative embodiments, the visitor communications interface includes other devices, for example, a display for presenting messages and still or video image information to visitors, in combination with the camera and/or the speakerphone.

In FIG. 1, the visitor monitor 110 includes an actuator 113, for example, a pushbutton, for indicating the presence of a visitor. In one embodiment, the actuator is part of a visitor alert, for example, a doorbell or other door ringer. In other embodiments, the actuator detects the presence of visitors without requiring the performance of any act. Various sensors may be used including, for example, magnetic or capacitive proximity sensors, infrared and optical sensors among many others.

The exemplary visitor monitor 110 also includes a controller 114 that controls the operation of the visitor communications interface and other functions of the visitor monitor, additional examples of which are discussed further below. The controller may be a digital processing device or it may comprise analog circuitry, or a combination thereof. The exemplary visitor monitor also includes a power supply 115. In one embodiment, the power supply includes an AC input with an AC to DC converter with battery backup.

The exemplary visitor monitor also includes other elements or components discussed further below. The visitor monitor or at least a portion thereof, for example, a speaker/microphone or camera or display, may be mounted at a height typical of visitor eye or face level. While the schematic block diagram of FIG. 1 illustrates the visitor monitor as being an integrated device, portions of the device may be located separately. For example, components of the visitor communications interface may be exposed on an exterior building wall or facade, while the power supply, controller and other components may be located some distance from the visitor communications interface components, for example, within a wall panel. The exemplary visitor monitor 110 also includes a gateway short-range radio (SRR) transceiver, for example a Bluetooth transceiver, 116 and an infrared transceiver 117, discussed more fully below, that may be located separately from the components of the visitor communications interface to provide optimum transmission and reception performance.

In FIG. 1, the exemplary intercom system includes a communications network gateway 120, which is typically located in a building, for example, in a home remotely from the location of the visitor monitor 110. The exemplary network gateway 120 includes a cellular modem 122 that communicates with a cellular communications network, for example, GSM/GPRS, or a CDMA, or a UMTS W-CDMA wireless communications network among other cellular communications networks. The cellular modem 122 is essentially a fixed base cellular communications device that includes its own unique identification, for example, an Electronic Serial Number (ESN), which is a 32-bit identifier for specified cellular communications devices, or a Mobile Equipment Identity (MEID) or some other identification. In GSM/GPRS cellular communications modems, the ESN and other user information is stored on a GSM Subscriber Identification Module (SIM).

The exemplary network gateway 120 also includes a visitor monitor short-range radio transceiver 123 that communicates wirelessly with the gateway SRR (e.g. Bluetooth) transceiver 116 of the visitor monitor 110. In other embodiments, the transceiver 116 of the visitor monitor and the transceiver 123 of the network gateway comply with some other open or proprietary wireless communications protocol.

In an alternative embodiment, one or more of the visitor monitors are communicably coupled to the network gateway by a hardwired connection. The gateway 120 and particularly the cellular modem 122 thereof communicates voice, message, for example, SMS format messages, to a remote cellular subscriber enabled terminal 134 over a cellular communications network as discussed further below. In some embodiments, the network gateway 120 also communicates data, for example, image information received form the visitor monitor 110, over a data network, for example, over the Internet 132, via network gateway 130. In one embodiment, for example, data captured by the visitor monitor, for example, image information, received by the network gateway 120 from the visitor monitor 110 is communicated over a GPRS data network to an image server 140 communicably coupled to the cellular communications network, wherein the image information stored on the image server 140 may be retrieved by the remote terminal 134, as discussed further below. In other embodiments, however, data may be communicated directly to the remote terminal, for example, to a remote terminal that communicates with the network gateway using a short-range radio protocol when the remote terminal is within a short-range communication area of the network gateway.

Figure 2:
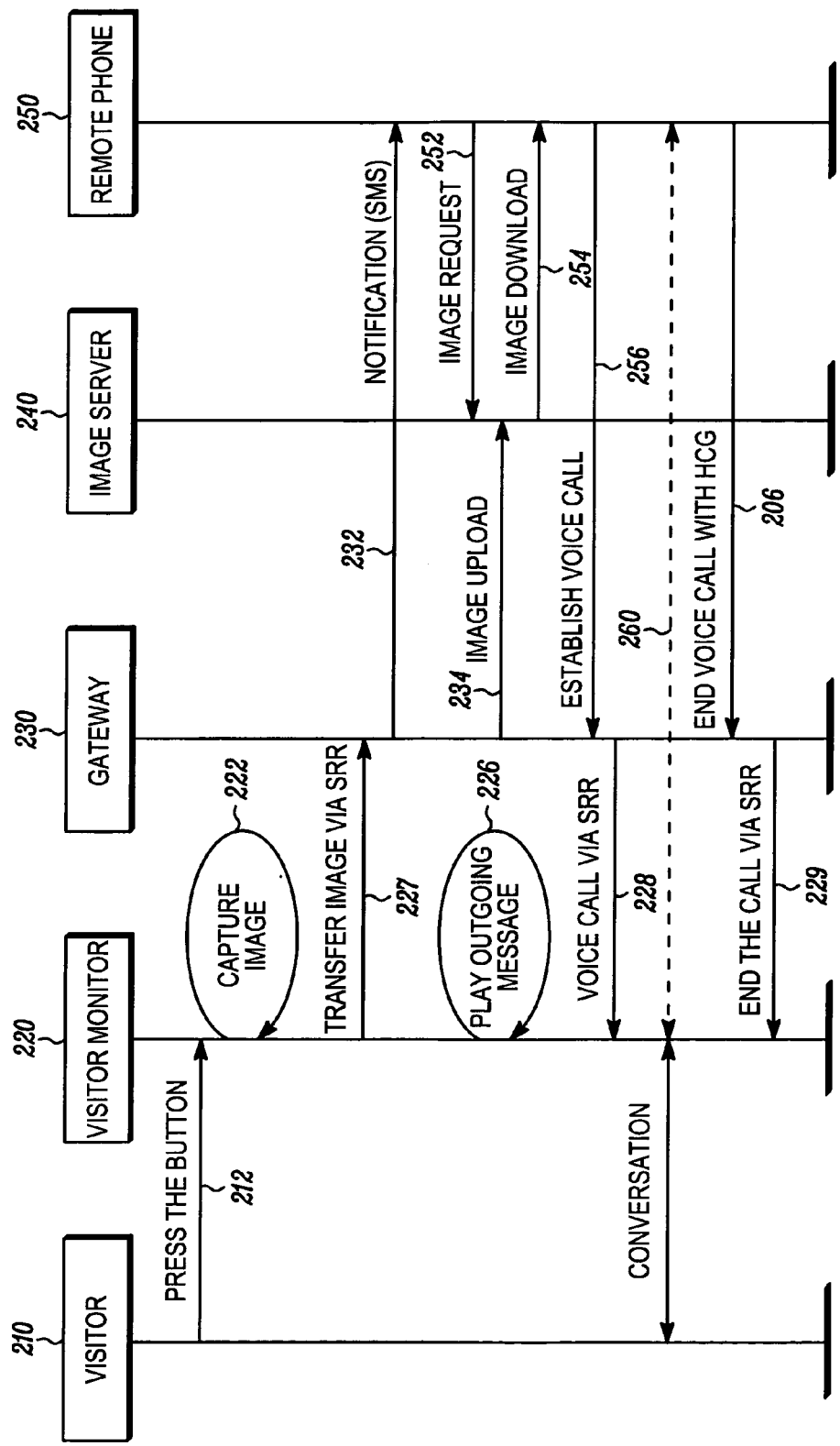
FIG. 2 illustrates exemplary communications between entities of an exemplary intercom system.

In FIG. 2, a visitor or other monitored object 210 activates the visitor monitor 220 by providing an input 212 at the visitor monitor, for example, upon pressing a button or upon being sensed by the visitor monitor. In the exemplary embodiment, the visitor monitor 220 captures 222 an image, for example, a still photo or video image or clip, of the visitor and transfers 224 the image to the network gateway 230. As discussed above, the image transfer may occur over a radio or hardwire connection between the visitor monitor and the network gateway. In some embodiments, the visitor monitor also presents information 226 to the visitor at the visitor communications interface. Audio and/or video messages may be pre-recorded and stored at the visitor monitor for subsequent playback upon detecting the presence of a visitor or upon actuation of the visitor monitor, as discussed further below.

In FIG. 2, upon receiving the image information from the visitor monitor, the network gateway transmits a notification 232 to the associated cellular remote terminal 250 via the cellular modem. In the exemplary embodiment, the notification is an SMS or other format message transmitted from the network gateway over the cellular communications network to the remote terminal 250. The network gateway also uploads 234 the image information to image server 240 upon receiving the image information from the visitor monitor 220. The image uploading and notification processes may occur simultaneously or in a sequential order other than that suggested by the illustration of FIG. 2.

In FIG. 2, upon receipt of the notification at the remote phone or terminal 250, the device requests 252 the image information from the image server 240. In one embodiment, the notification message automatically prompts the remote terminal 250 to request the image from the image server 240 without any input by the user of the remote terminal. If the image upload to the image server was successful and the image is available on the server 240, the image is downloaded at 254 to the remote terminal. The downloaded image or video may be presented on a display of the remote terminal, whereupon the user of the terminal will be apprised of the visual identity of the visitor at the visitor monitor.

In some embodiments, if desired, the user of the remote terminal 250 may establish a voice call 256 with the visitor monitor via the network gateway 230 upon receipt of the notification message 232. The image downloading and establishment of the voice call may be concurrent or in a different order than that suggested by the illustration in FIG. 2. Upon establishing the voice call with the network gateway 230, the gateway communicates 228 with the visitor monitor 220 either via a short-range radio, e.g., Bluetooth or some other short-range frequency, or via a hardwired connection to permit conversation 260 between the remote terminal 250 and the visitor 210 speaking at the visitor communications interface of the visitor monitor 220. In one embodiment, termination of the voice call is controlled by the remote terminal 250, which ends the voice call 258 upon communication with the network gateway 230. The network gateway terminates 230 the call by a subsequent communication 229 with the visitor monitor 220.

Figure 3:
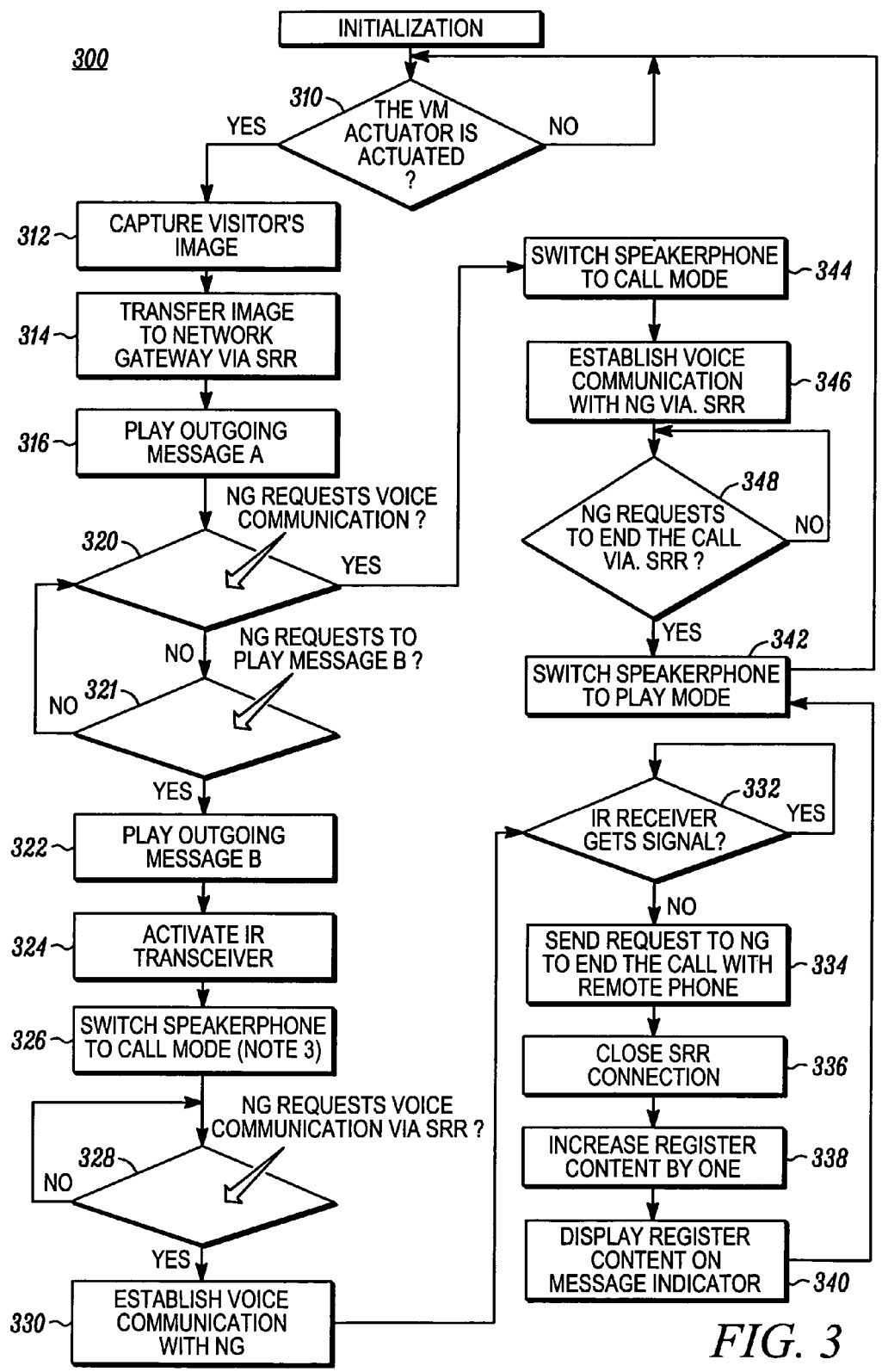
FIG. 3 illustrates an exemplary intercom system process.

In the exemplary process diagram 300 of FIG. 3, at logical block 310, a visitor monitor waits for actuation, for example, by sensing the presence of a visitor or other subject to be detected. In the exemplary embodiment, upon actuation or detection of the visitor, the visitor monitor captures an image of the visitor or subject at block 312, and at block 314 the captured image is communicated to the gateway, for example, by a radio or hardwired communications link. In some embodiments, there is no image capture, but the visitor monitor transmits an indication to the network gateway that a visitor or other entity has been detected by the visitor monitor. At block 316, in some embodiments, the visitor monitor presents information at the visitor communications interface for the visitor, as discussed above. In one embodiment, for example, the visitor monitor may provide a message as follows: "Hello, your image has been captured and is transferring. Please wait . . . " This and other audio and/or video messages may be pre-recorded and stored at the visitor monitor for playback upon detecting the presence of a visitor or upon capturing the visitor's image.

In FIG. 3, at block 320, a determination is made at the visitor monitor as to whether a voice communication has been requested. As discussed, the voice communication requests maybe originated by the remote terminal, for example, in response to receiving the notification message. The voice communication request is communicated from the remote terminal to the visitor monitor via the network gateway using one of the communications links or means discussed above.

In some embodiments, at logical block 321, the network gateway requests that the visitor monitor play a message, for example, upon expiration of a specified time period during which a voice communication request is not made at block 320. In one embodiment, in the absence of a voice call request, a play message request at block 321 may instruct or command the visitor monitor to provide the following invitation message: "Please leave your message after the tone", whereupon an audio capture or recording device of the visitor monitor captures or records an audio message from the visitor. The invitation message is played at logical block 322 in FIG. 3. This and other audio and/or video messages may be pre-recorded and stored at the visitor monitor for subsequent playback to visitors.

In some embodiments where the visitor monitor invites the visitor to leave a message at block 322, the message is communicated to a cellular communications network voicemail entity of the remote terminal. If the visitor is still present after the message invitation is played at block 322, the speakerphone in the visitor monitor is switched to a call mode at block 326 in anticipation of the establishment of a voice call required to leave a voice message in a cellular voicemail box of the remote terminal. The presence of the visitor may be detected and monitored by the visitor monitor, for example, by the IR transceiver 117 of FIG. 1, as indicated at block 324. The voice message from the visitor and corresponding visitor's image can be retrieved later by the remote device based on the voice message timestamp.

In FIG. 3, at block 328, the network gateway requests a voice communication with the visitor monitor on behalf of the remote terminal, and at block 330 the voice communication is established with the remote terminal. At block 332, the visitor monitor sensor monitors the presence of the visitor, during which time voice communication occurs. At block 332, when the IR transceiver or other detector determines that the visitor is no longer present, a request to terminate the voice call with the remote terminal is sent at block 334 by the visitor monitor to the network gateway. At block 336, the network gateway terminates the wireless communication with the visitor monitor. In embodiments with a register counter, discussed above, the register counter is incremented at block 338, and the register contents are displayed at the visitor monitor message indicator. Thereafter, the speakerphone is configured for the play message mode at block 342, and the process cycles to the beginning. In FIG. 1, the visitor monitor 110 includes a register 118.

In FIG. 3, if a voice communication request is received at block 320, then the visitor monitor speakerphone is switched to the call mode in anticipation of establishing a voice communication with the network gateway, for example, via the wireless connection at block 346. At logical block 348, the network gateway requests termination of the voice communication, and at block 342 the speakerphone is switched to play message mode.

Figure 4:
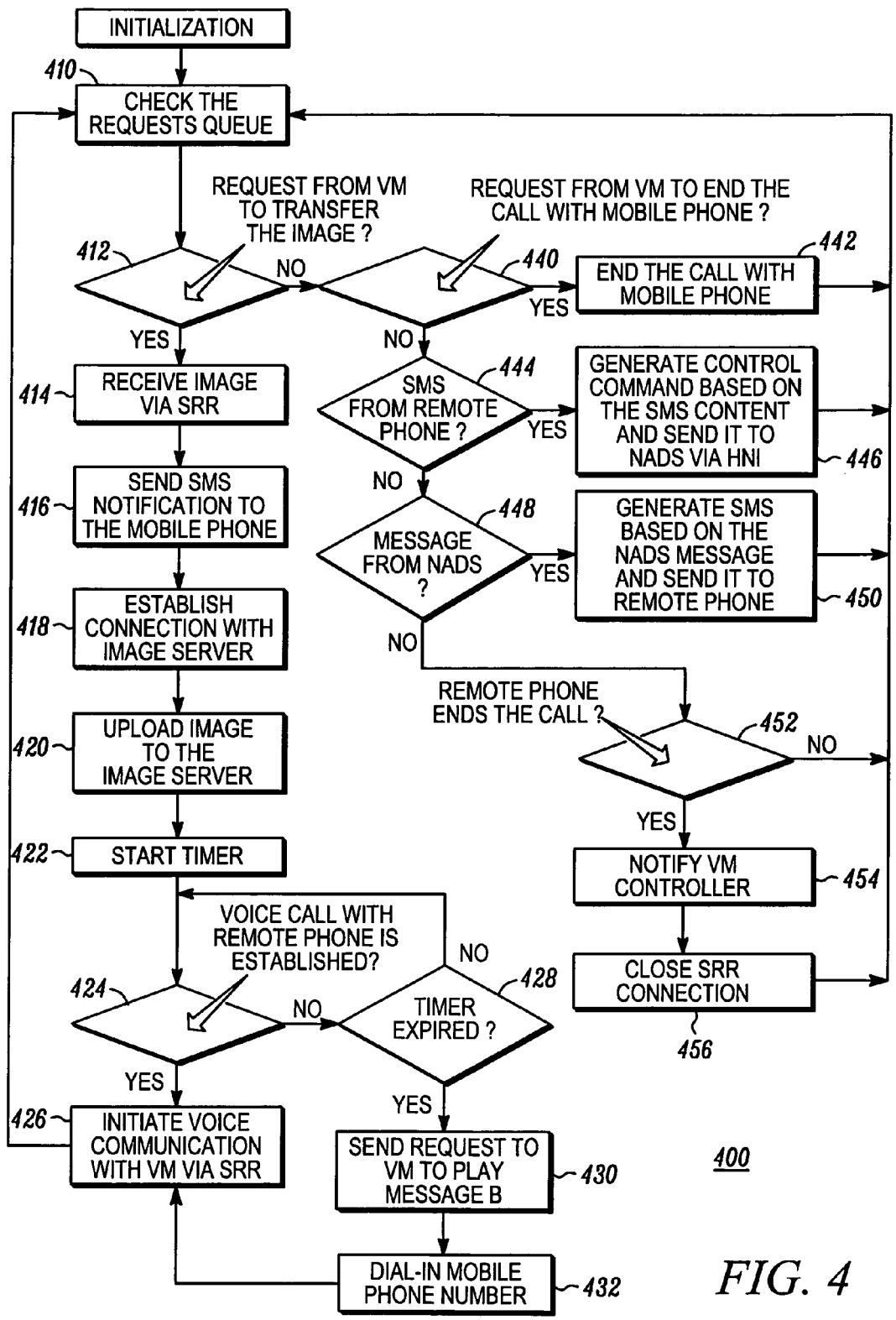
FIG. 4 illustrates another exemplary intercom system process.

In the intercom system gateway process 400 of FIG. 4, at logical block 410 a request queue is checked for messages. The request queue indicates how many times the visitor monitor attempted to communicate with the network gateway, or alternatively the request queue may indicate how many times the visitor monitor was actuated by a visitor. The request queue entries may also be time stamped.. At block 412, if there is a request from the visitor monitor to transfer information, for example, an image, the network gateway receives the image or other information via the radio or other communications link between the visitor monitor and network gateway at block 414. At block 416 the network gateway sends a notification, for example, an SMS or other format message, to the remote terminal, for example, a mobile cellular subscriber telephone or other cellular communications enabled mobile device or a fixed based cellular communications device. Transmission of the notification to the remote terminal is prompted by receipt of the request from the visitor monitor.

In FIG. 4, at block 418, the network gateway establishes a connection with an image server in embodiments where image or other information is communicated from the visitor monitor, as discussed above. At block 420, the network gateway uploads the image or other information received from the visitor monitor to the image or other information server. At block 422, a timer is started for a period during which a voice call may be established with the remote terminal, for example, by the remote terminal as discussed above in connection with FIG. 2. In other embodiments, however, the voice call may be established by the network gateway, for example, to forward messages left at the visitor monitor to the remote terminal as discussed below. At block 424, if a voice call is established with the remote terminal, the network gateway initiates a voice call with the visitor monitor, for example, via the exemplary radio link or some other medium. At block 424, if the voice call is not established within a pre-determined time-out period or upon expiration of the timer as determined at block 428, the visitor monitor is instructed to play an outgoing message at block 430. An exemplary outgoing message follows: "Please leave your message after the tone". In one embodiment, the timer is implemented in the network gateway, though in other embodiments the timer may be implemented in the visitor monitor. At block 432, the cellular gateway dials-in the number of the remote terminal to forward the message from the visitor monitor to the remote terminal voicemail box. In FIG. 4, at block 412, if the visitor monitor does not transfer information to the network gateway, the network gateway determines at block 440 whether there is a request to end or terminate the voice call with the subscriber device. If there is a request to end the call at block 440, the call is ended at block 442.

In FIG. 4, at block 440, if there is no request from the visitor monitor to end the call, the gateway determines at block 444 whether there is a message, for example, an SMS message from the remote terminal. In one embodiment, the message from the remote terminal includes control information, which may be used to control a network of appliances, devices and sensors (NADS), as discussed further below. At block 446, a command or other control is generated, for example, at a NADS interface of the network gateway in response to the message from the remote terminal, for controlling a network of such devices.

In FIG. 4, at block 444, if the visitor monitor does not transfer information to the network gateway, at block 448, a determination is made as to whether any messages have been received from the NADS. At block 450, if a NADS originated message has been received, a message is generated and transmitted to the subscriber device. In the exemplary process, if there are no messages at block 448, the call is ended, for example, by the remote terminal device at block 452. At block 454, the network gateway notifies the visitor monitor that the call has been ended, and the radio link between the visitor monitor and the network gateway is closed at block 456.

Figure 5:
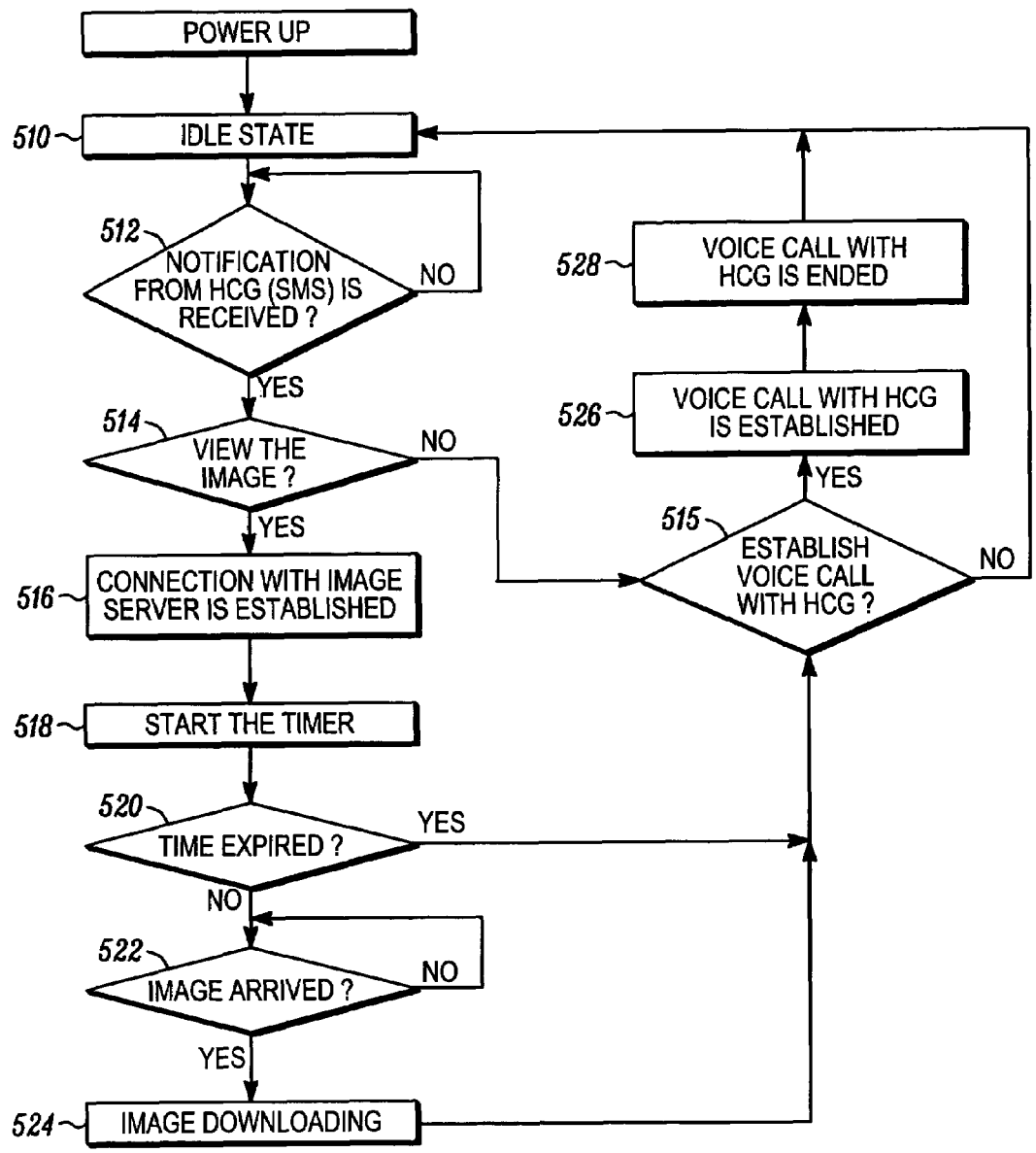
FIG. 5 illustrates another exemplary intercom system process.

In the exemplary remote terminal process 500 of FIG. 5, at logic block 510, a cellular enable remote terminal or other remote intercom system device, for example, a wireless telephone handset, in the idle mode determines whether a notification has been received from the network gateway at block 512. When a notification has been received, a determination is made as to whether the user wants to view image or other information, for example, within a predetermined timeframe, at block 514. If not, an attempt is made to establish a voice call with the network gateway at block 515 as discussed above in connection with the discussion of FIG. 2. At block 516, the remote terminal connects to the image or other information server, and in some embodiments a timer is started at block 518. If the timer expires at block 520 before the image or other information has arrived at the image server, an attempt is made to establish a voice call with the network gateway at block 515. Upon arrival of the image at the server at block 522 prior to expiration of the timer, the image or other information is downloaded to the remote terminal at block 524. An option is provided at the remote terminal to establish a voice call with the network gateway at block 515. A voice call is successfully established at block 526 and terminated upon its completion at block 528. Messages received from the network gateway are forwarded to the remote terminal voicemail box.

Figure 6:
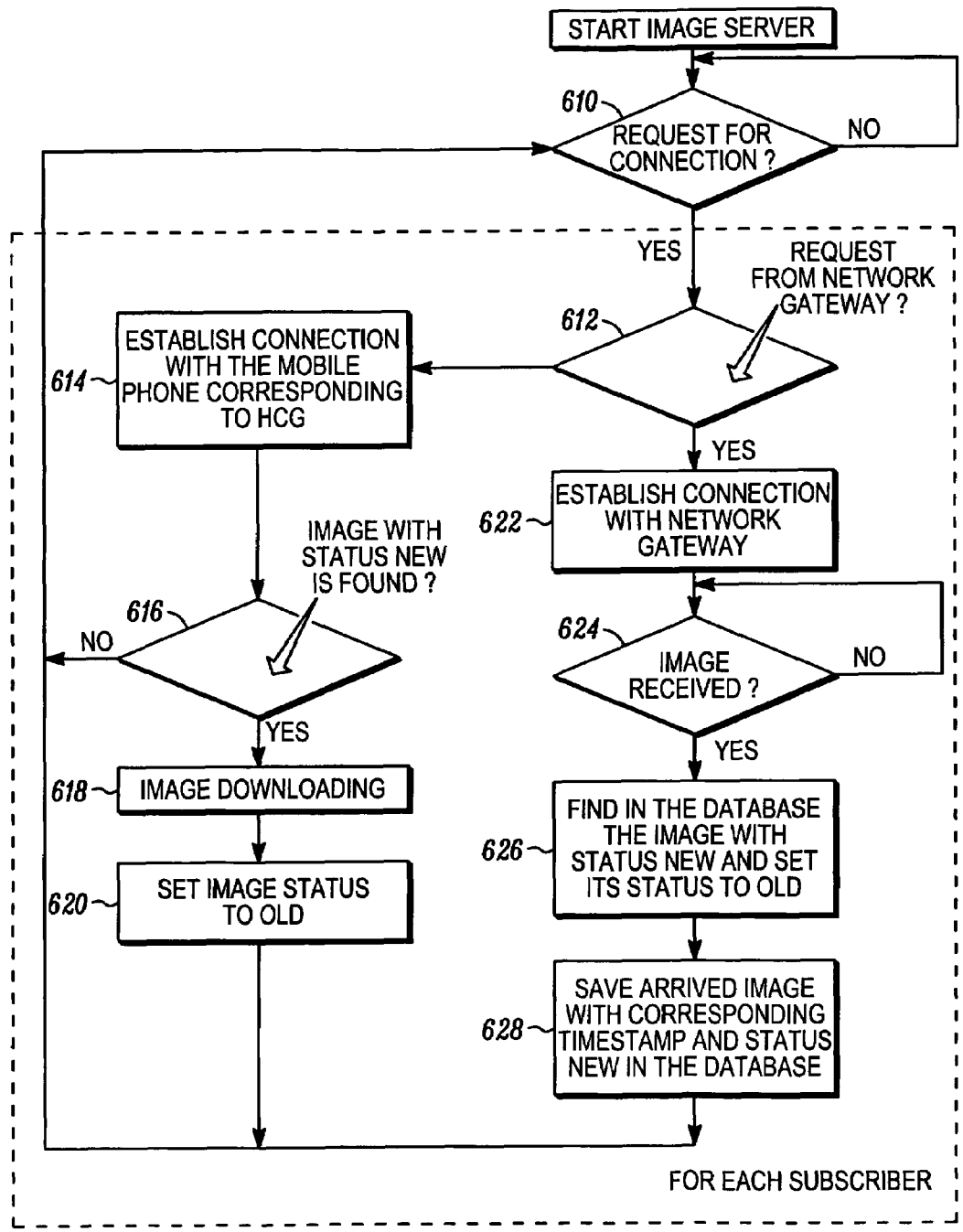
FIG. 6 illustrates an exemplary intercom system image server process.

In the exemplary image or other intercom system information server process 600 of FIG. 6, at logic block 610, the server awaits a connection request from either a network gateway or a remote terminal. Upon receipt of the request, the source of the request is determined at block 612. If the request is from a remote terminal, a connection is established with the remote terminal at block 614. At block 616, a determination is made as to whether new information, for example, a new image, has been uploaded to the image server by the network gateway for the remote terminal connected to the server. If not, the process returns to the state of logic block 610. If new information has been uploaded for the connected remote terminal, the images is downloaded to the device at block 618, and the status of the image is changed from NEW, for example, to OLD at block 620. If the connection request is from the network gateway at block 612, then a connection is established with the network gateway at block 622. If an image is received at block 624, the status of any previously received images designated for the same recipient stored on the server is change from NEW to some other designation. At block 628, the newly received image or other information is designated NEW and in some embodiments the new image is also time stamped.

Figure 7:
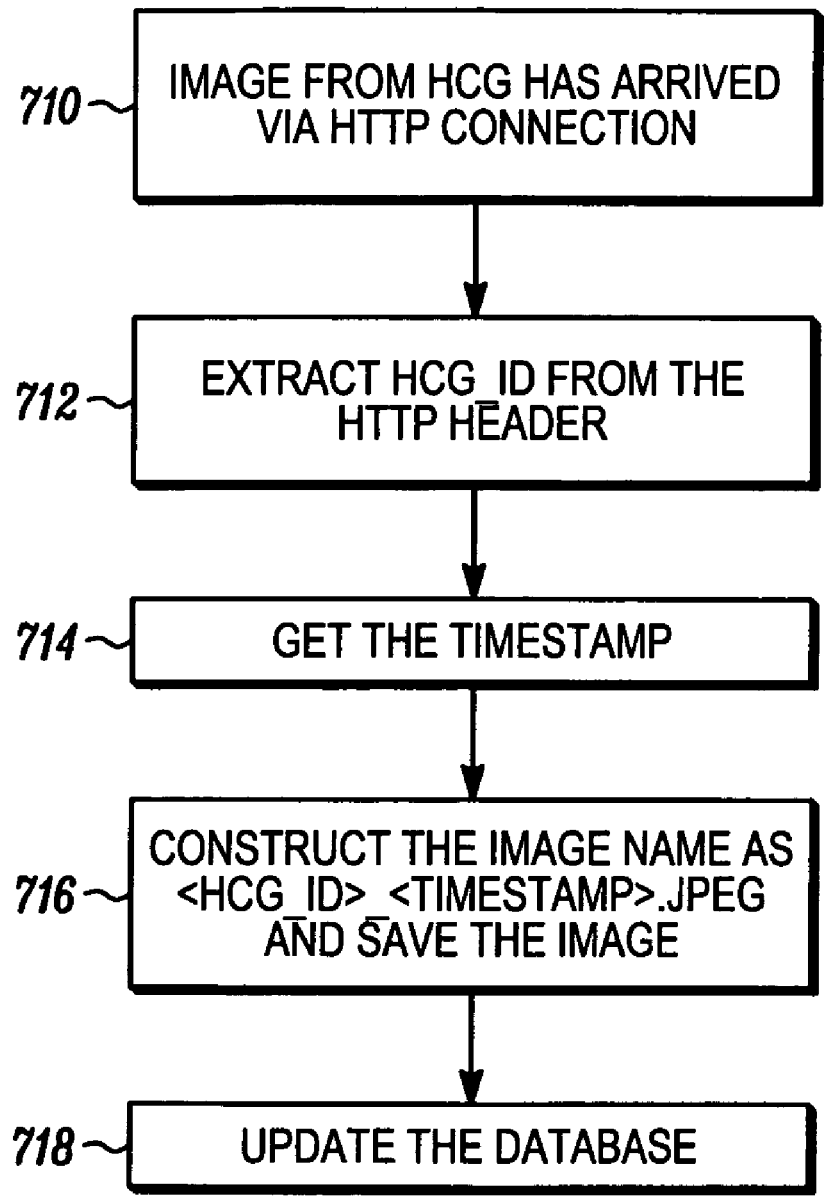
FIG. 7 illustrates another exemplary intercom system image server process.
Figure 8:
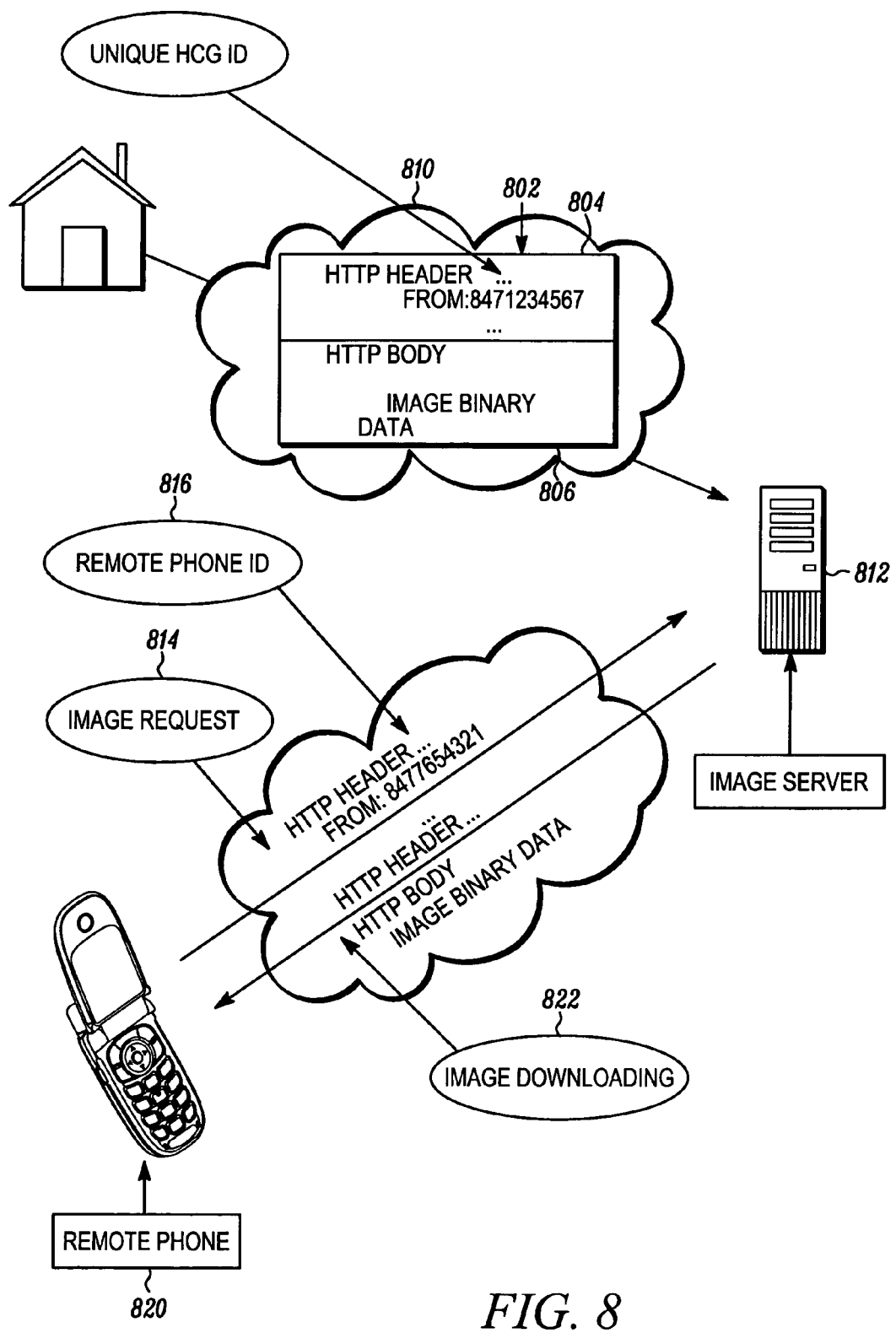
FIG. 8 is an exemplary image transfer diagram.

In the exemplary image or other intercom system information server process 700 of FIG. 7, at logic block 710, an image or other information is received from a network gateway, for example, using a Hypertext Transfer Protocol (HTTP) or other protocol connection, as discussed generally above in connection with FIG. 6. In one embodiment, image data is received from the network gateway over a GPRS data network. At block 712, the network gateway identification, "HCG_ID" is extracted from the HTTP header. FIG. 8 illustrates schematically image information 802 communicated from a network gateway over a network 810 and to an exemplary image server 812. The exemplary HTTP or other protocol format message includes a header portion 804 including the network gateway identification, and a body portion 806 with the exemplary image information. In FIG. 7, a time stamp is obtained, for example, from a local clock, for the image information. At block 716, an image name is constructed based on the network gateway identification and in some embodiments based on the time stamp. The exemplary image name includes an extension for the image file format, for example, "JPG". At block 718, the image server database is updated with the new image information.

Figures 9, 10, 11:
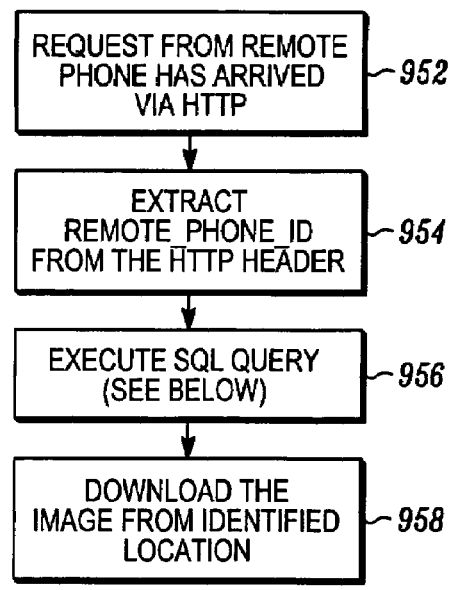
FIG. 9 illustrates an exemplary table mapping network gateway identities with remote terminal identities.
FIG. 10 illustrates an exemplary table mapping network gateway identities with time stamp and image information.
FIG. 11 illustrates an exemplary intercom system image server process.

FIG. 9 illustrates an exemplary table 900 mapping network gateway identities in column 910 with corresponding cellular subscriber or other device identities in column 920. More generally, each network gateway may be associated or mapped with more than one remote terminal or device in corresponding remote terminal columns of the table. According to this exemplary association scheme, all remote terminal identities in the same row as the network gateway identity are associated. FIG. 10 illustrates an images table that maps a network gateway identity "HCG-ID" 930 from which an image is received with any timestamp 932, the image storage path 934 and any image status information 936.

In the exemplary intercom system image server process 950 of FIG. 11, at logic block 952, the server receives a connection request from a remote terminal as discussed generally above in connection with FIG. 6. FIG. 8 illustrates an image request 814 including an HTTP header with the remote terminal identity 816 sent by a remote terminal 820 to the image sever 812. In FIG. 11, at block 954, the image server extracts the identity "REMOTE_PHONE_ID" of the remote terminal from the image request header. At block 956, the image server executes a routine for associating the identity of the remote terminal to image information stored on the image server. An exemplary SQL query for performing this function follows:

```
SELECT IMAGE_PATH FROM IMAGES, ID_MAPPING WHERE
    ID_MAPPING.HCG_ID = IMAGES.HCG_ID
    AND
    REMOTE_PHONE_ID = <REMOTE_PHONE_ID
    extracted from the
header>
    AND
    STATUS = "NEW";
```

The SQL Query returns either the full path to the image, for example, "/images/18471234567_02_19_2004_20:02:44.jpeg", from the corresponding entry in the image table illustrated in FIG. 9, or NULL if the specified criteria was not satisfied. Any image information retrieved is downloaded to the subscriber device as indicated at 822 in FIG. 8.

In one embodiment, the remote terminal operates in a local mode wherein the terminal communicates with the network gateway using a short-range wireless communications protocol when the terminal is within a relatively short-range communication area of the network gateway, and the remote terminal operates in a remote mode wherein the terminal communicates with the network gateway using a longer range wireless communications, for example, a cellular protocol, when the terminal is outside the relatively short-range communication area of the network gateway.

In this exemplary embodiment, the network gateway also includes a short-range radio transceiver for communicating with a short-range transceiver in the remote terminal when the terminal is within range. In FIG. 1, the network gateway 120 includes a short-range radio transceiver 124 for this purpose. In the exemplary system of FIG. 1, the remote terminal 134 communicates with the visitor monitor 110 via the cellular modem 122 when the terminal is outside the range of the network gateway short-range radio transceiver. In FIG. 1, the range of the short-range radio transceiver that communicates with the remote terminal in the local mode is indicated as the "Home Area". When the remote terminal is within the range of the network gateway, the remote terminal 134 communicates with the visitor monitor 110 via the short-range radio transceiver 134.

Figure 12:
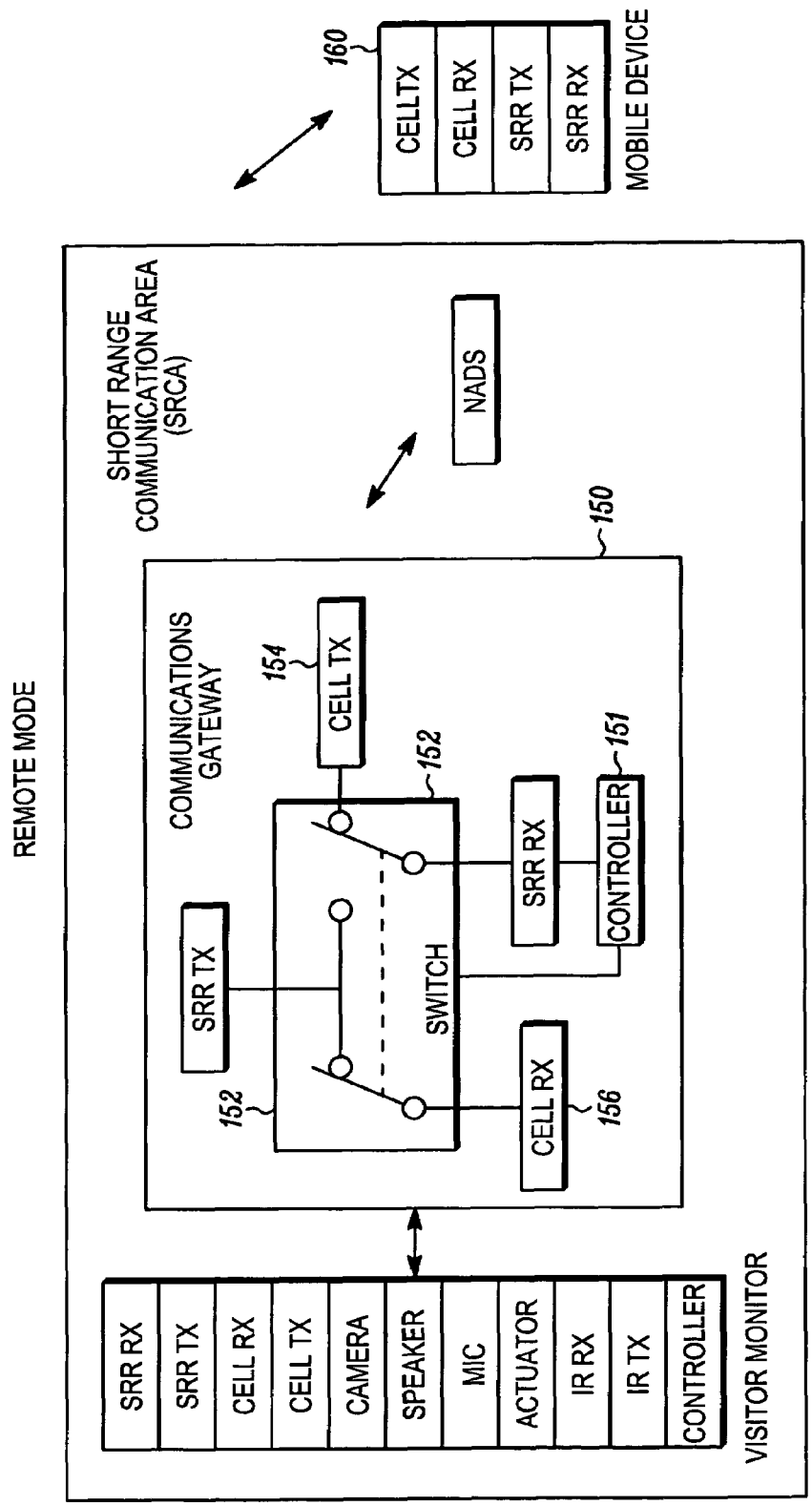
FIG. 12 illustrates an exemplary network gateway configured for communicating with a remote terminal in remote mode.
Figure 13:
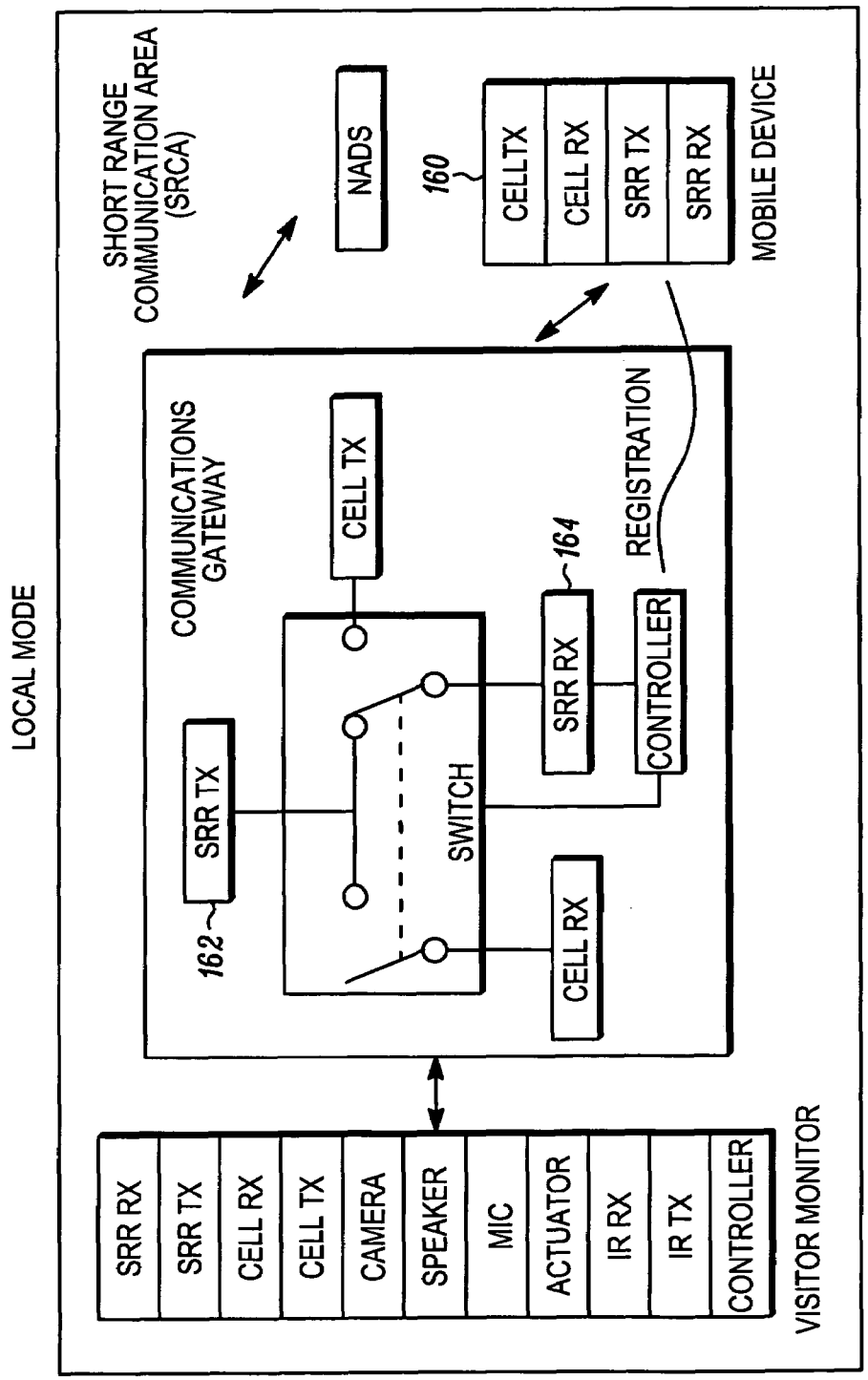
FIG. 13 illustrates an exemplary network gateway configured for communicating with a remote terminal in local mode.

In one embodiment, the remote terminal registers with the network gateway or otherwise indicates that it is within range of the short-range radio transceiver. In FIG. 12, the network gateway 150 includes a controller 151 that operates a switch 152 for configuring the network gateway for communicating with the remote terminal using either a cellular communications modem or a short-range radio transceiver. In FIG. 12, the network gateway 150 is configured for communication with the remote terminal 160, which is located outside the short-range communication area, using the cellular transmitter 154 and cellular receiver 156. In FIG. 13, the network gateway 150 is configured for communication with the remote terminal 160, which is located inside the short-range communication area, using the short-range radio transmitter 162 and receiver 164.

Generally, the remote terminal has at least one means for communicating with the visitor monitor via the network gateway, for example, either a cellular transceiver or a short-range radio transceiver. In embodiments where the remote terminal includes a short-range radio transceiver, image information captured by the visitor monitor may be communicated to the remote terminal via the network gateway either directly, or alternatively via an intermediate entity wherein the network entity sends a notification to the remote terminal as discussed above in connection with FIG. 2. Also, voice communications may be established by the remote unit or by the network gateway to permit forwarding of messages from the visitor monitor to a voicemail box accessible the remote terminal. Alternatively, voice messages left at the visitor monitor may be stored at a recoding devoice located locally at the visitor monitor, or at the network gateway or at some other location.

In FIG. 1, the exemplary network gateway 120 also comprises a network of appliances, devices and sensors (NADS) interface 126 for communicating with a controller of NADS 127. Exemplary NADS controllers include, among others, the X10 Security & Home Remote Control System available from RADIO SHACK, WLAN interface, a broadband interface, and a Zigbee interface among others. The network gateway 120 enables communications between the NADS controller and a remote terminal, for example, the cellular enabled remote terminal 134 in FIG. 1.

In one embodiment, the remote device, for example, the cellular subscriber device, includes an application enabling it to monitor and control one or more appliances, devices or sensors in the network. For example, the remote device may include a Java or some other application that allows the remote user to monitor and control interior and exterior lights, garage doors, alarms, etc. at home from the remote device.

In one embodiment, communications between the remote terminal and network gateway are secured using the public key model. In one embodiment, a pair of asymmetric public and private keys is generated by the remote device and network gateway during the intercom system installation. The corresponding private keys are kept in secret by the remote device and the network gateway, while the public keys are exchanged between the home network gateway and remote device. Each message sent from the network gateway to the remote device is encrypted using the remote device public key. Each message, e.g., command, sent from the remote device to the network gateway is signed using the remote device private key. Similar security schemes may be implemented between the network gateway and the NADS and visitor monitor.

Figure 14:
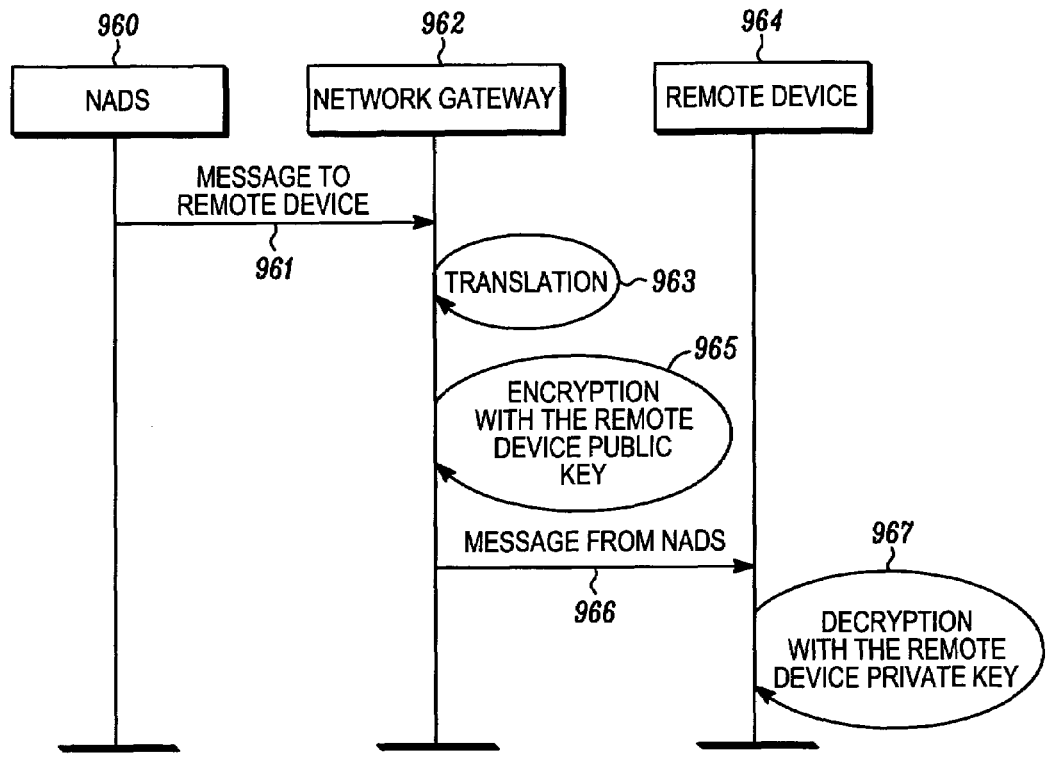
FIG. 14 illustrates exemplary communications from a network of appliances, devices and sensors (NADS) and a remote subscriber device.

FIG. 14 illustrates an NADS controller 960 sending a message 961 to a remote terminal or cellular subscriber device 964 via a network gateway 962. The network gateway translates 963 the message from a format of the NADS controller to a format compatible with the communications protocol, for example cellular or short-range radio protocol, used by the network gateway to communicate with the remote terminal. The network gateway than encrypts 965 the message, for example, with a remote device public key discussed further below. The information communicated from the NADS controller may be, for example, status information for applications, devices and sensor in the NADS network. The encrypted messages 966 sent from the network gateway to the remote device are thus accessible by the remote device, which decrypts 967 the messages using the private key.

Figure 15:
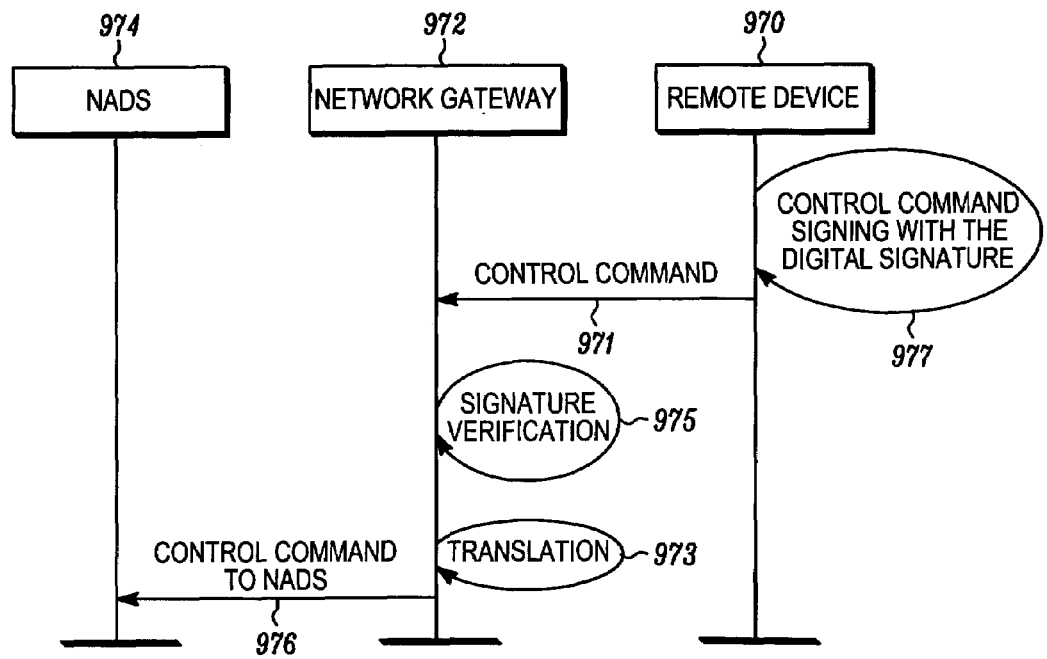
FIG. 15 illustrates exemplary communications from a remote terminal to a network of appliances, devices and sensors (NADS).

FIG. 15 illustrates a remote device 970 sending a digitally signed message 971, for example, in the exemplary form of an SMS message, to the NADS 974 via a network gateway 972. In the exemplary embodiment, the message is not encrypted, though in other embodiments the message is encrypted. The remote terminal 970 signs 977 the message with a digital signature using the private key. The information communicated from the remote terminal is, for example, controls or commands for applications, devices and/or sensors in the NADS network 974. The signed control command 971 is communicated to the network gates 972, which verifies 975 the signature using the public key received from the remote terminal. If the source of the message is authenticated, the network gateway translates 973 the message from the SMS or other format originating from the remote terminal to a format compatible with the NADS controller. The network gateway communicates 976 the exemplary control command to the NADS 974.

Figure 16:
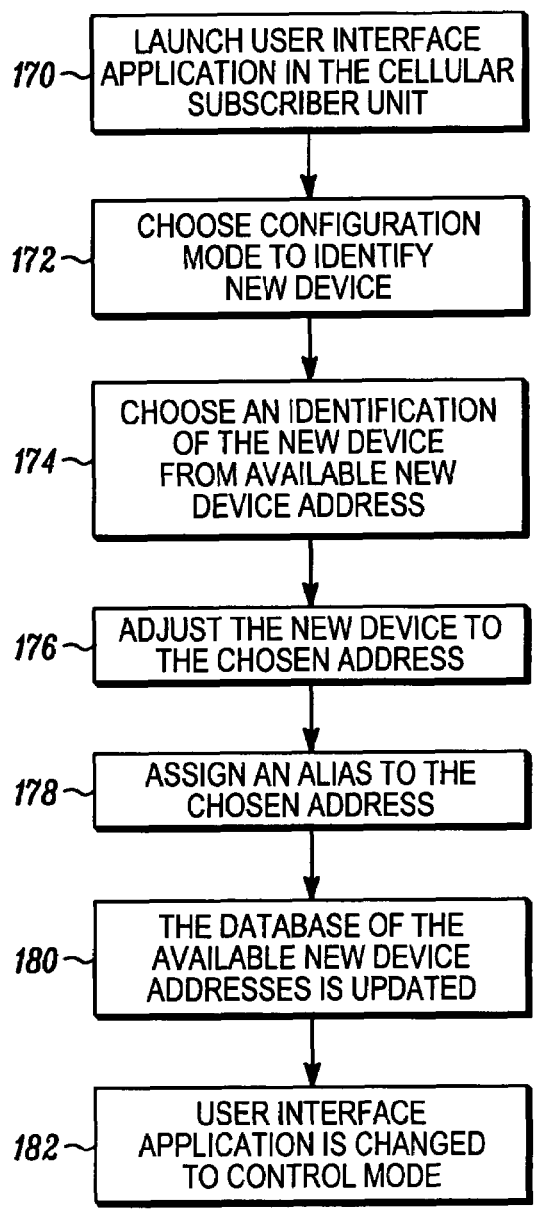
FIG. 16 is a process flow diagram for identifying new devices in a network of appliances, devices and sensors.

In one embodiment, the remote terminal includes a user interface application, for example, a JAVA or other application, having a control mode enabling the terminal user to control appliances and other devices, for example, home appliances, in the NADS from the remote terminal as discussed. In one embodiment, the application also includes a configuration mode that allows the user to configure the identity of new appliances and devices in the NADS. FIG. 16 illustrates an exemplary process in the configuration mode. At logical block 170, the user interface application is launched in the remote terminal, and at block 172 the configuration mode is selected to identify a new device. At block 174, the user selects the identification for the new device. In one embodiment, the identification is selected from a list of available identifications, for example, from a drop-down list of identifications. The list of available addresses is updated so that the selected address is no longer available for assignment to new devices. The new device is manually adjusted or configured for the new address, as indicated at bock 176. At block 178, the user is prompted to input an alias for the address selected. The alias is preferably something that is easily understood or remembered for the associated new device or appliance. In one embodiment, the application is automatically configured to the control mode after the identification has been assigned to the new device. At block 180, a database of devices used by the application is updated to include the new device for which an address has been selected. When the application is configured in the control mode, the new device will be included in the list of displayed devices. In another embodiment, the terminal user access control of the device or appliance by inputting the address of the new device at the user interface of the remote terminal.

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. An intercom system, the intercom system comprising:
a visitor monitor;
a communications network gateway located remotely from the visitor monitor,
the visitor monitor communicably coupled with the communications network gateway, information received at the visitor monitor communicated to the communications network gateway,
the communications network gateway having a cellular radio transceiver and a short-range radio transceiver, the short-range radio transceiver capable of communicating over a corresponding short-range communication area, the communications network gateway communicating information, received from the visitor monitor, from either the cellular radio transceiver or the short-range radio transceiver depending on whether an intended recipient of the information is within the short-range communication area.

2. The intercom system of claim 1,
the communications network gateway including a switch selecting one of the cellular radio transceiver and the short-range radio transceiver depending on whether the intended recipient of the information is within the short-range communication area.

3. The intercom system of claim 2,
the communications network gateway including a controller that operates the switch selecting one of the cellular radio transceiver and the short-range radio transceiver,
the controller operating the switch based on whether the intended recipient of the information has registered within the short-range communication area.

4. The intercom system of claim 1,
the visitor monitor including a visitor monitor short-range radio transceiver,
the communications network gateway including a gateway short-range radio transceiver,
information communicated between the visitor monitor and the communications network gateway communicated using the gateway short-range radio transceiver and the visitor monitor short-range radio transceiver.

5. A method in an intercom system, the method comprising:
receiving information at a visitor monitor;
communicating the information received at the visitor monitor to a remotely located communications network gateway;
transmitting a message from the communications network gateway to a remote terminal in response to receiving the information at the communications network gateway using one of a cellular radio transceiver and a short-range radio transceiver depending on a proximity of the remote terminal to the communications network gateway.

6. A method in an intercom system, the method comprising:
detecting the presence of a visitor at a visitor monitor;
communicating information received at the visitor monitor in association with the visitor detected to a remotely located communications network gateway;
communicating a notification that the presence of the visitor has been detected to a remote terminal;
forwarding the information received from the communications network gateway to the remote terminal after communicating the notification if the remote terminal requests the information.

7. The method of claim 6,
detecting the presence of a visitor at a visitor monitor includes capturing image information of the visitor;
communicating the image information to the remotely located communications network gateway;
forwarding the image information received from the communications network to an image server for retrieval by the remote terminal.

8. The method of claim 6, establishing a voice communication between the communications gateway and the visitor monitor for the remote terminal after communicating the notification to the remote terminal.

9. The method of claim 8, transmitting voice communications between the visitor monitor and the remote terminal using one of a cellular radio transceiver and a short-range radio transceiver of the communications network gateway depending on a proximity of the remote terminal to the communications network gateway.

10. The method of claim 6, forwarding a voice message from the visitor monitor to a voicemail box of the remote terminal via the communications network gateway.

11. A method in an intercom system, the method comprising:
communicating information received at the visitor monitor indicating the presence of a visitor from a remotely located communications network gateway to a remote terminal;
forwarding a voice message from the visitor monitor to a voicemail box of the remote terminal via the communications network gateway if the remote terminal does not establish a voice call within a specified time interval.

12. The method of claim 11, establishing a voice call with the remote terminal from the communication network before forwarding the voice message to the voicemail box of the remote terminal.

13. The method of claim 11, communicating information received at the visitor monitor indicating the presence of the visitor from a remotely located communications network gateway includes communicating a notification message to the remote terminal.

14. A method in an intercom system image server, the method comprising:
receiving information from a source;
obtaining identification information for the source from which the information was received;
obtaining timestamp information associated with the receipt of the information;
generating a name for the information received using the identification information for the source from which the information was received and the time stamp information,
the name including the identification information for the source from which the information was received and the time stamp information.

15. The method of claim 14,
receiving the information from a communications network gateway in a message including gateway identification information,
extracting the cellular gateway identification information from the message before generating the name,
using at least a portion of the identification information for at least a portion of the name.

16. The method of claim 14,
receiving information from a communications network gateway in a message including cellular radio transceiver identification information in a message header portion,
extracting the cellular radio transceiver identification information from the message header before generating the name,
using at least a portion of the cellular radio transceiver identification information for at least a portion of the name.

17. The method of claim 14,
receiving image information from a source;
generating the name for the information received using an image format extension.

18. A method in an intercom system image server, the method comprising:
receiving a request for information from a remote device;
searching for the information requested using identification information for the remote device requesting the information.

19. The method of claim 18,
searching for the information requested includes identifying a cellular gateway associated with the identification information for the remote device, and
using identification information for the cellular gateway to locate information associated with the cellular gateway.

20. The method of claim 18,
communicating information associated with the cellular gateway to the remote device,
changing a status of the information associated with the cellular gateway to indicted that the information has been communicated to the remote device.

21. The method of claim 18,
receiving the request for information from the remote device in a message having a header including the identification information for the remote device,
searching for the information requested includes identifying a cellular gateway associated with the identification information using the identification information for the remote device and a table mapping cellular gateway identification information with identification information for remote devices.

* * * * *